Feb. 8, 1966  A. ASHKIN  3,234,474
PARAMETRIC AMPLIFICATION AND GENERATION OF OPTICAL
FREQUENCY ELECTROMAGNETIC WAVES WITH TUNING
Filed Sept. 18, 1962  3 Sheets-Sheet 1
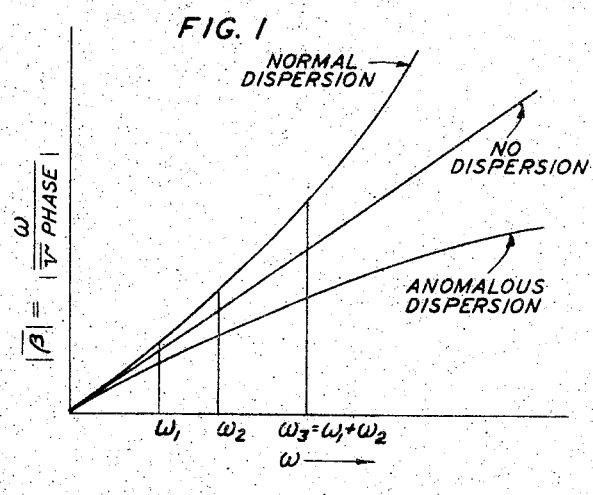
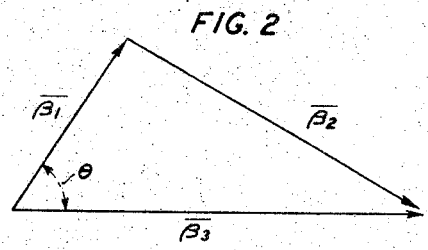
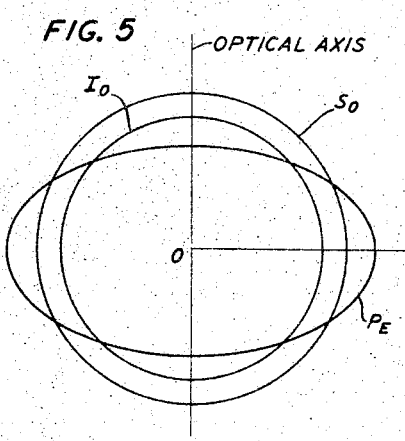
INVENTOR
A. ASHKIN
BY
David P. Kelley
ATTORNEY

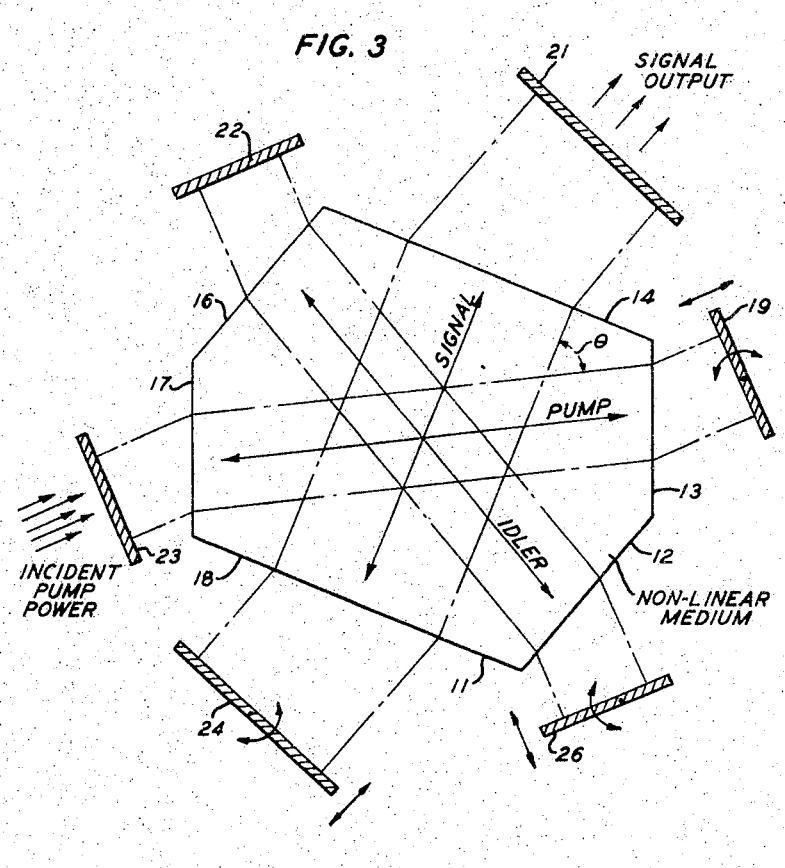

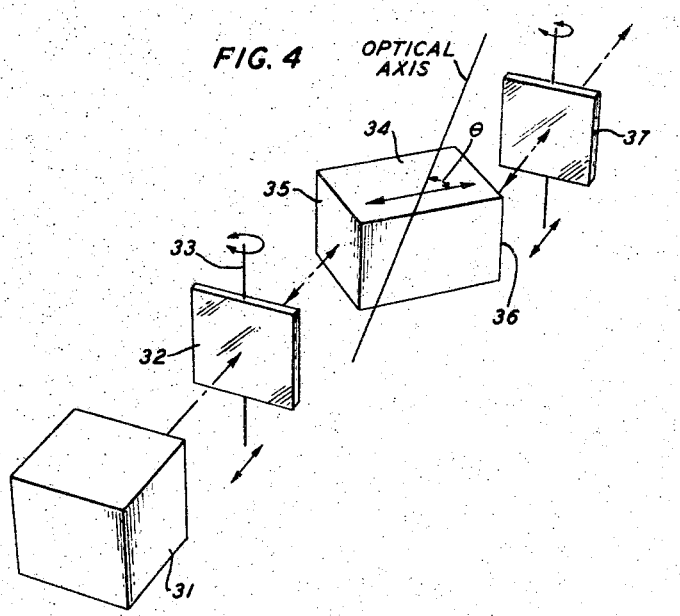

# United States Patent Office

3,234,474
Patented Feb. 8, 1966

3,234,474
PARAMETRIC AMPLIFICATION AND GENERATION OF OPTICAL FREQUENCY ELECTROMAGNETIC WAVES WITH TUNING
Arthur Ashkin, Bernardsville, N.J., assignor to Bell Telephone Laboratories Incorporated, New York, N.Y., a corporation of New York
Filed Sept. 18, 1962, Ser. No. 224,294
5 Claims. (Cl. 330—4.5)

This invention relates to parametric oscillators and amplifiers and more particularly to the parametric generation and amplification of electromagnetic waves at optical and high microwave frequencies.

In an article entitled "Parametric Amplifier and Frequency Mixing in Propagating Circuits," by P. K. Tien, Journal of Applied Physics, volume 29 (1958), at page 1347, it is shown that traveling wave interaction and hence traveling wave parametric amplification or oscillation are possible if certain $\omega$–$\beta$ conditions are satisfied where $\omega$ represents frequency and $\beta$ represents propagation constant. These conditions are that $$\omega_{\text{signal}} + \omega_{\text{idler}} = \omega_{\text{pump}} \tag{1}$$

and $$\bar{\beta}_{\text{signal}} + \bar{\beta}_{\text{idler}} = \bar{\beta}_{\text{pump}} \tag{2}$$

In the copending United States patent application Serial No. 158,267 of Giordmaine and Kleinman, there is disclosed the use of negative uniaxial crystals having the property of birefringence to produce harmonic generation of coherent light. By proper choice of the direction through the crystal of the applied light, the Tien $\omega$–$\beta$ condition can be satisfied so that the induced light may be made to add cumulatively in appropriate phase over an extended path, and the output is a harmonic of the optical input energy. For the particular structure shown, only one harmonic is produced, as explained in that application, and the device is not tunable over a range of frequencies.

The present invention is based upon the discovery that an optical nonlinear medium which exhibits anomalous dispersion, as will be discussed more fully hereinafter, can be made to satisfy the Tien $\omega$–$\beta$ condition and if the medium is used in a parametric oscillator the oscillator can be made tunable over a wide range of frequencies. Unfortunately, most nonlinear optical media available to date which have the necessary property of birefringence to produce parametric oscillation exhibit normal dispersion and as a consequence, as pointed out in the foregoing, when used as parametric oscillators or amplifiers they have been designed to operate with a single set of frequencies.

In the case of nonlinear optical media having anomalous dispersion, since the propagation constants are vector quantities, as will be explained more fully hereinafter, the frequency of the induced wave can be made to vary with the angle between the optic axis and the direction of the applied wave.

It is an object of the present invention to produce a wide range of output frequencies in a tunable parametric oscillator utilizing a nonlinear doubly refracting negative uniaxial crystal.

It is another object of the present invention to amplify a wide range of input signals in a device utilizing such a crystal.

These and other objects of the present invention are achieved in an illustrative embodiment thereof wherein a doubly refractive negative uniaxial crystal is located within a resonator of the Fabry-Perot type represented by partially transparent mirrors spaced from the ends of the crystal. The crystal utilized has a difference of velocity between the ordinary rays and the extraordinary rays sufficient to satisfy the condition $|\bar{\beta}_1| + |\bar{\beta}_2| > |\bar{\beta}_3|$ where $\beta_1$ and $\beta_2$ are the propagation constants of the induced waves and $\beta_3$ is the propagation constant of the incident wave. The incident light energy upon the crystal is selected to have the polarization of the extraordinary rays and the induced waves have the polarization of the ordinary rays. In addition, the crystal is cut so that the optic axis thereof is at an angle to its longitudinal axis, the angle depending upon the birefringence of the crystal.

It is a feature of the present invention that each of the mirrors is rotatable and movable in translation toward or away from the crystal. Rotation of the mirrors produces a variation in the angle between the optic axis of the crystal and the direction of propagation of the energy through the crystal while the translational movement of the mirrors changes the resonant frequency of the resonators.

As will be explained more fully hereinafter, with such an arrangement, the proper crystal can be made to exhibit what appears to be anomalous dispersion despite the fact that it is typically of normal dispersion and, as a consequence, the oscillator or amplifier can be tuned over a wide range of frequencies as the angle between the optic axis and the direction of propagation of the energy through the crystal is varied and the resonance of this system for the frequencies within the range can be maintained.

These and other objects and features of the present invention will be readily apparent from the following detailed description taken in conjunction with the accompanying drawings, in which:

FIG. 1 is a diagram showing the various types of dispersion;

FIG. 2 is a vector diagram of the propagation constants of waves in a medium exhibiting anomalous dispersion;

FIG. 3 is a diagrammatic view of an arrangement demonstrating the principles of the invention;

FIG. 4 is a perspective view of a preferred embodiment of the invention; and

FIG. 5 is a diagram showing the ordinary and extraordinary wave polarization in a birefringent crystal.

Before discussing the invention, let us consider the behavior of an optical nonlinear medium which exhibits anomalous dispersion. In FIG. 1, there is shown an $\omega$ versus $\beta$ graph which shows the three conditions of dispersion—normal dispersion, no dispersion, and anomalous dispersion. From FIG. 1, it can be seen that, for anomalous dispersion, $$|\bar{\beta}_1| + |\bar{\beta}_2| > |\bar{\beta}_3| \tag{3}$$

Inasmuch as $\bar{\beta}$ is a vector quantity, the Tien $\bar{\beta}$ condition of Equation 2 can be satisfied by proper choice of the direction of propagation of the energy at the frequencies $\omega_1$, $\omega_2$, and $\omega_3$ in the medium. This is demonstrated in FIG. 2. For the condition of FIG. 2, cumulative parametric gain will occur in the medium and thus it is possible to make an optical parametric oscillator from the medium assuming there is sufficient gain to overcome the various losses. It can also be seen from FIG. 2 that for a fixed pump frequency, the angle $\theta$ is a continuous function of the signal frequency. Thus, in order to change the oscillation frequency, it is necessary only to change the angle $\theta$, that is, the direction of the signal wave energy relative to the pump wave energy. The idler frequency will automatically adjust to satisfy the $\omega$–$\beta$ conditions; that is, it will form a closed triangle as shown in FIG. 2. In FIG. 3, there is shown an arrangement by which the nonlinear optical medium may be made to oscillate at a number of different frequencies by observing the conditions demonstrated in FIGS. 1 and 2. The device disclosed in FIG. 3 comprises a nonlinear optical medium 11 which exhibits anomalous dispersion. Medium 11 is so formed as to have six flat surfaces or faces 12, 13, 14, 16, 17, and 18, with opposite faces 12 and 16, 13 and 17, and 14 and 18, preferably parallel with each other. Adjacent each of the faces and spaced therefrom are a plurality of mirrors 19, 21, 22, 23, 24, and 26 which are adjustable both in translation toward or away from the medium and rotatable relative to the face of the medium, as shown by the arrows. Mirrors 21 and 23 are made partially reflecting while the remaining mirrors may be, and preferably are, totally reflecting. Optical pumping energy at frequency $\omega_3$ is supplied from a source 27 and passes through mirror 23 into the medium 11 at an angle to the optic axis thereof. Mirrors 19 and 23 are adjusted translationally so that they form a resonator resonant at the pump frequency and thus the pump energy will travel back and forth through the medium. Placing the signal resonator at angle $\theta$ with respect to the pump, the pump energy will generate within the crystal a signal frequency which will propagate at a phase velocity $\bar{\beta}_1$ through the medium at the angle $\theta$ to the pump frequency. By adjusting mirrors 21 and 24 translationally, they can be made to form a resonator resonant at the signal frequency. Generation of the signal frequency also gives rise to the generation of an idler frequency which propagates through the medium at a phase velocity $\bar{\beta}_2$. As pointed out before, the direction of propagation of the idler frequency will automatically adjust itself so that the vector quantities $\bar{\beta}_1$, $\bar{\beta}_2$, and $\bar{\beta}_3$ form the closed triangle of FIG. 2. Mirrors 22 and 26 are adjusted translationally and rotationally to be resonant at the idler frequency and to accommodate the idler direction. Such an arrangement, as disclosed in FIG. 3, satisfies the conditions of FIG. 2 and hence the Tien $\omega-\beta$ conditions and signal gain is produced. The signal frequency can be tuned by rotating mirrors 21 and 24, thereby varying the angle $\theta$ between the pump and signal and also changing the signal frequency since, as was pointed out before, the signal frequency is dependent upon the angle $\theta$. The idler frequency will automatically change and the idler mirrors are rotated to accommodate the change of direction of propagation through the medium to satisfy the condition of FIG. 2.

Preferably, the angles of entry into the active medium are roughly the Brewster angle so as to minimize surface reflecting losses. Alternatively, it is equally preferable that the external medium between the active medium and the mirror be a liquid whose index roughly matches the index of refraction of the active medium. This has the advantage that the path length in the resonator is quite insensitive to changes in the angle of the light. It is necessary, however, that different liquids be used for each of the frequencies involved. If the external medium is such a liquid or a vacuum or some other nondispersive meduim, the idler phase is automatically correct as it passes back and forth through the active medium. If the idler wave were not in correct phase on its passes through the medium, deamplification would occur instead of gain.

From the foregoing, we have seen how a medium which exhibits anomalous dispersion can be made to make a parametric oscillator or amplifier which is tunable over a range of frequencies by varying the angle $\theta$ between the path of propagation of the pump energy and the path of propagation of the signal energy. In FIG. 4, there is shown a preferred embodiment of the present invention wherein a birefringent negative uniaxial crystal is utilized as the active medium. This crystal may be, for example, potassium dihydrogen phosphate (KDP) provided the variation of phase velocity with direction for the ordinary or O ray and the extraordinary or E ray is sufficiently great. The crystal displays normal dispersion for both the O and E waves; however, if the difference in the variation of phases velocity with direction of these two waves within the crystal is large enough, it is possible to produce within the crystal an effective anomalous dispersion.

The device of FIG. 4 comprises a source of pumping power 31, which in the case of optical frequency operation, may be, for example, a ruby optical maser which produces a relatively high power coherent light beam at the desired frequency. Such a device is well known to workers in the art, and, in its most typical form, comprises a ruby rod silvered at its ends, with a source of exciting radiation and a filter transmitting only the coherent light of the desired frequency. The wave energy from source 31 is applied to a partially transparent mirror 32 which, as indicated in the figure, has an axis of rotation 33 and is also movable in translation. The actual mechanism by which the mirror 32 is rotatable and translationally movable has not been shown, since such mechanism may take any number of forms well known to workers in the art.

The wave energy from source 31 passes through mirror 32 and impinges upon a face 35 of a nonlinear optical medium 34, preferably at, or near, the Brewster angle so as to reduce reflection losses at the desired polarization of the light for the extraordinary ray, the polarization being, for example, horizontal. As pointed out before, medium 34 may be any one of a number of nonlinear, birefringent, negatively uniaxial optical media, such as, for example, KDP. The incident energy passes through crystal 34 and, upon being emitted at face 36 of the crystal, is directed toward a partially transmissive mirror 37 from which a portion of it is reflected back into medium 34. It is possible, in accordance with current knowledge in the art, to make mirror 37 completely reflective to energy at the particular wavelength of the source 31 so that all of that energy will be reflected back into medium 34.

As pointed out in the aforementioned Giordmaine Kleinman application, the passage through the medium 34 of the incident pump energy from source 31 generates a second, or signal wave, which, in the case set forth in that application, is a harmonic of the impinging wave. The same phenomenon occurs in the case of the present invention; however, in the present invention the generated wave is not necessarily a harmonic of the incident wave. Nor does it propagate in the same direction. For simplicity, the signal resonator has not been shown, but it is to be understood that in all but special cases such a resonator is used.

In FIG. 5 there is shown a diagram of the variation of phase velocity with direction for the ordinary, or O rays, and the extraordinary, or E rays, of a negative uniaxial, birefringent crystals. FIG. 5 likewise demonstrates the variation of $\beta$ with direction since $\beta$ is inversely related to the index of refraction. In such a crystal, such as KDP, both the O and the E rays show normal dispersion separately. However, the difference between the O and the E waves is, in some crystals, large enough that by proper selection of the type of ray of the pump, signal, and idler waves, anomalous dispersion can be achieved, that is $|\bar{\beta}_1|+|\bar{\beta}_2|>|\bar{\beta}_3|$. In the diagram of FIG. 5, the greatest change in phase velocity is exhibited by the E ray; therefore, in accordance with the principles of the present invention, the pump energy, supplied from source 31, is made the E ray. For maximum increase in phase velocity, it is obvious from FIG. 5 that the pump energy should be directed perpendicular to the optical axis, along the line O—A. When the pump energy is so directed, by adjustment of mirrors as was done in the embodiment FIG. 3, the signal and idler waves may be made to form the closed triangle of FIG. 2, so that parametric gain occurs. Although no idler resonator has been shown, it is to be understood that such a resonator may be used if desired.

The principles of the invention have been demonstrated in a single illustrative embodiment thereof wherein incident pump energy is utilized to induce a signal wave. It is to be understood that the device is readily usable as a parametric amplifier when there is a source of signals to be amplified, and it is intended that such an arrangement is within the scope of the invention. It will be readily apparent to workers in the art that it is not necessary to have a single nonlinear medium provided a second medium can be made to match the $\bar{\beta}$ condition in order that the return phase of the idler be proper for gain in the first direction. It will also be apparent to workers in the art that for a doubly reflecting media to match the $\bar{\beta}$ condition, it is not necessary to have as much a difference between the index of refraction of the parametric oscillator as in the simple frequency doubling case. It is possible that the $\bar{\beta}$ condition can be matched by making the signal frequency low and the idler frequency closer to the pump frequency. In addition, while the principles of the invention have been demonstrated using optical frequencies, they are equally applicable to devices operating in the high microwave frequency range.

Various other embodiments utilizing the principles of the present invention will be readily apparent to workers in the art without departing from the spirit and scope thereof.

What is claimed is:

1. In combination, a source of electromagnetic radiation at an optical frequency $\omega_3$, a nonlinear birefringent crystal for receiving radiation from said source at an angle to the optic axis thereof, said crystal propagating both ordinary and extraordinary rays therethrough, the variation of the phase velocities of the ordinary and extraordinary rays relative to their direction of propagation through the crystal being different, means for varying the direction of the radiation of said source relative to the optic axis of said crystal, said radiation giving rise to induced radiation within the crystal which propagates in a direction substantially different from the applied radiation, the induced radiation being a different type ray than the applied radiation, the dispersion characteristic of the crystal being such that $|\beta_1|+|\beta_2|>|\beta_3|$ where $\beta_3$ is the propagation constant of applied radiation and $\beta_1$ and $\beta_2$ are propagation constants within the crystal of waves of frequencies $\omega_1$ and $\omega_2$, cavity resonators for each of the frequencies $\omega_1$, $\omega_2$, $\omega_3$ where $\omega_3$ is the frequency of the applied radiation, the frequencies being related by $\omega_1+\omega_2=\omega_3$, at least one of the propagation constants $\beta_1$ and $\beta_2$ representing induced radiation, and means for adjusting the frequency of the output radiation of the crystal comprising means for selecting the direction of propagation of the induced radiation, said direction being different from the applied radiation, said last mentioned means comprising at least one of said cavity resonators having a variable resonant frequency, the axis of said cavity resonator being adjustable relative to the optic axis of said crystal such that $\bar{\beta}_1+\bar{\beta}_2=\bar{\beta}_3$ prevails.

2. The combination as claimed in claim 1 wherein each of said cavity resonators comprise first and second mirrors, at least one of which is only partially reflecting.

3. The combination as claimed in claim 2 in which one of said mirrors is totally reflecting to the energy from said source.

4. In combination, a source of electromagnetic radiation at an optical frequency $\omega_3$, a nonlinear birefringent crystal for receiving radiation from said source at an angle to the optic axis of said crystal, said crystal propagating both ordinary and extraordinary rays therethrough, the variation of the phase velocities of the ordinary and extraordinary rays relative to their direction of propagation through the crystal being different, the propagation constant of the source radiation in the crystal being $\beta_3$, said radiation giving rise to induced radiation within the crystal the induced radiation being a different type ray than the applied radiation which propagates in a direction substantially different than the applied radiation, the dispersion characteristic of the crystal being such that $|\beta_1|+|\beta_2|>|\beta_3|$, where $\beta_1$ and $\beta_2$ are the propagation constants within the crystal of waves of frequencies $\omega_1$ and $\omega_2$, at least one of said waves being induced radiation, the frequencies of the waves being related by $\omega_1+\omega_2=\omega_3$, and means for varying the frequency $\omega_1$ comprising means for varying the angle between $\beta_1$ and $\beta_3$, said last mentioned means comprising adjustable cavity resonators and means for varying the direction of propagation of the incident energy relative to the optic axis of the crystal to produce $\bar{\beta}_1+\bar{\beta}_2=\bar{\beta}_3$.

5. The combination as claimed in claim 4 wherein the source radiation propagates through said crystal as the extraordinary ray.

References Cited by the Examiner

Giordmaine: "Physical Review Letters," Jan. 1, 1962, pages 19–20.

Lasers and Applications: Edited by Chang, Engineering Experiment Station, Ohio State University, Columbus, 1963, pages 192–201.

Kingston: "Proceedings of the IRE," April 1962, page 472.

Kroll: "Physical Review," Aug. 15, 1962, pages 1207–1211.

ROY LAKE, *Primary Examiner.*